United States Patent [19]

Hartup et al.

[11] Patent Number: 5,127,963
[45] Date of Patent: Jul. 7, 1992

[54] PROCESS FOR DETOXIFYING LEAD CONTAMINATED MATERIALS

[75] Inventors: George R. Hartup; Jack E. Leonard, both of Indianapolis, Ind.

[73] Assignee: Rubber Recycling, Inc., Indianapolis, Ind.

[21] Appl. No.: 673,021

[22] Filed: Mar. 21, 1991

[51] Int. Cl.$^5$ .......... B08B 3/08; C22B 3/06; C22B 3/12; C22B 3/20

[52] U.S. Cl. .......... 134/26; 134/13; 134/10; 134/28; 134/29; 134/25.1; 423/DIG. 20; 423/588; 423/89

[58] Field of Search .......... 134/10, 13, 26, 28, 134/29, 25.1; 423/DIG. 20, 588, 89

[56] References Cited

U.S. PATENT DOCUMENTS

| | | | |
|---|---|---|---|
| 1,168,418 | 1/1916 | Ramage | 423/89 |
| 4,460,442 | 7/1984 | Ducati | 204/114 |
| 4,927,510 | 5/1990 | Olper et al. | 204/114 |

FOREIGN PATENT DOCUMENTS 113945 2/1985 U.S.S.R. .......... 423/89

OTHER PUBLICATIONS

Cadman and Dellinger, "Techniques for Removing Metals from Process Wastewater", Chemical Engineering, Apr. 15, 1974, p. 79.

Primary Examiner—Theodore Morris
Assistant Examiner—Zeinab El-Arini
Attorney, Agent, or Firm—Woodard, Emhardt, Naughton, Moriarty & McNett

[57] ABSTRACT

A novel chemical extraction/washing process is described for detoxifying lead contaminated materials, and in particular, for detoxifying broken lead/acid storage battery casings made from ebonite. In particular, the preferred process of the invention enables the lead content of broken ebonite battery casing material to be reduced to the point that the processed ebonite is no longer a potential harzardous waste by any EPA definition. In the preferred embodiment, the novel process of the invention makes use of the chemical leaching capabilities of nitric acid, and the water solubility of lead nitrates, to dissolve and then wash away the combined lead compounds that contaminate and render hazardous broken ebonite battyer casing material, leaving a clean and usable ebonite product for recycling.

16 Claims, 1 Drawing Sheet

PROCESS FOR DETOXIFYING LEAD CONTAMINATED MATERIALS

The present invention relates generally to processes for recycling toxic materials, and more particularly is concerned with a process for detoxifying lead contaminated materials, including specifically, ebonite battery casings of spent lead/acid storage batteries.

BACKGROUND OF THE INVENTION

Lead/acid storage batteries are the principal means for storing electrical energy for use in vehicles and industrial applications. Although such batteries typically have service lives measured in years, they eventually become unable to take or hold a charge and must be replaced with new batteries.

The lead content of the grids, plates, and mud of spent lead/acid storage batteries can be readily recovered by processing these materials through the furnaces of a secondary lead smelter. The lead content of any materials remaining on battery casings made of nonporous plastic (polypropylene), can also be recovered relatively easily by simply washing the plastic battery casing material with an aqueous detergent followed by a water rinse. The plastic battery casing material can then be recycled.

Today, most battery casings for lead/acid storage batteries are made from plastic. However, a significant number of battery casings were and are still being produced from ebonite, or "hard rubber." Although the composition of ebonite has varied slightly among manufacturers, a generic composition of typical ebonite is shown in Table I.

TABLE I

Typical Components of Ebonite Battery Casing Materials.
(Components are listed in order of decreasing
weight percentage in an average collection
of these materials.)

gilsonite (a natural carbonaceous material) or powdered coal
thermoplastic resin binder
bituminous asphalt
non-asbestos fibrous materials and filler fibers
lampblack pigment
mineral wax
comminuted rubber Ebonite is hard and black in color, and the addition of the small amount of comminuted rubber to ebonite led the industry to adopt the term "hard rubber" to identify this material.

Though strong and inexpensive, ebonite has been largely displaced by plastic in battery casing production because of the expense and difficulty associated with the disposal of lead-contaminated ebonite. Unlike plastic, ebonite is relatively porous and has small cracks and crevices on its surface, making it much more difficult to clean. During the useful life of a lead/acid storage battery that has an ebonite casing, lead-contaminated electrolyte works into the pores, cracks and crevices in the ebonite and deposits lead-bearing materials. When an ebonite battery casing is broken by a battery recycler, some of this lead-bearing material is readily mobilized, but much of it remains absorbed and adsorbed within the ebonite, significantly contaminating the material with combined lead compounds.

In the past, broken ebonite battery casings have been fed as fuel into specifically equipped furnaces at secondary lead smelters, with attendant lead recovery. However, because not all furnaces could readily accept ebonite battery casing material, very few recycling sites for lead-bearing ebonite actually existed. Before the implementation of federal hazardous waste landfill rules, secondary lead smelter managers who where recycling spent lead/acid storage batteries found it simpler and cheaper to discard ebonite battery casing material on their own sites rather than to equip their furnaces to recycle it. There are, therefore, sizable accumulations of discarded, lead-contaminated ebonite battery casing material at numerous former battery recycling sites.

According to the U.S. Environmental Protection Agency (EPA), there are at least 25 major Superfund sites in the United States at which the principal hazardous material preventing effective site cleanup is lead contaminated ebonite battery casing material. These Superfund sites are large, and contain millions of square feet of lead contaminated ebonite battery casing material and lead contaminated soil and other materials. An exemplary composite analysis of wastes from such sites is shown in Table II.

TABLE II

Components Identified in Ebonite Battery Casing Pile Materials
Gathered at Two Abandoned Secondary Lead Smelter Sites.

| Component | Percentage |
| --- | --- |
| ebonite | 87.4 |
| lead oxides | 4.8 |
| plastic | 2.0 |
| elemental lead (grids) | 1.9 |
| fine material, not identified | 1.6 |
| soil, rocks | 1.1 |
| paper | 0.8 |
| wood | 0.4 |
| separators | 0.4 |

Careful examination of the lead-containing materials in the ebonite battery casing piles, chemical analysis, and literature searches indicated the presence of a wide variety of lead compounds at abandoned secondary lead smelter sites, predominately the more easily handled common oxide and sulfate. Very little lead dioxide or lead tetroxide was found to exist in any of the many samples tested from waste sites, making cleanup of such sites easier.

Analysis of the lead contamination within spent ebonite battery casings, whether taken from waste site materials or from freshly broken batteries, is accomplished in one of two ways. The total lead content of ebonite battery casing material is determined by digesting the material thoroughly in a strong oxidizing acid, such as concentrated nitric acid. This oxidizes much of the case material and mobilizes essentially all of the lead contamination, which can then be quantified by solution spectroscopic methods (typically atomic absorption spectrometry). For determining the environmental hazard posed by this waste material, the EPA has developed two different extractable lead methods. The older EP Tox (Extraction Procedure for Toxicity Characteristic) test used manual additions of acetic acid to the waste, while the newer TCLP test (Toxicity Characteristic Leaching Procedure) uses treatment with an acetic acid buffer. Although the two tests give slightly different results, they employ the same basic chemistry and the criterion for judging the material hazardous by each is identical: if the final leachate has more than 5 mg/L lead, the waste is hazardous.

Typical values found at Superfund sites where broken ebonite battery casing material has been tested by these methods are, a total lead content of 5000 mg/kg and an EP Tox (TCLP leachate) value of 50 mg/L. EPA regulations allow battery breakers to sell or utilize freshly broken ebonite battery casing material as a non-hazardous material if the EP Tox (TCLP leachate) test results can be reduced to below 5 mg/L. At Superfund sites, Applicants have been advised that the EPA considers the cleanup complete if the total lead content of the site's ebonite battery casing material can be reduced to less than 500 mg/kg and if the EP Tox (TCLP leachate) value can be brought below 5 mg/L.

Today, there are a number of secondary lead smelters with battery recycling operations that still discard broken ebonite battery casing material, even though the material must now be shipped to a licensed hazardous waste landfill with associated high transportation and disposal costs. The high costs of licensed disposal of ebonite battery casing material, and the high costs associated with a successful Superfund site cleanup, have created major economic incentives for a process for recovering lead from broken ebonite battery casing material, but to date there has been no demonstrated method for successfully performing these tasks.

An electrowinning technology works for removing lead contaminates only in a narrowly defined concentration range. Outside of the narrow concentration ranges most useful for this technology, electrowinning performs poorly. Several battery recyclers have attempted to utilize electrowinning technology to recycle lead contaminated broken ebonite battery casing material, but have now abandoned this technology. In addition to its poor performance, electrowinning uses a dangerous chemical and consumes vast amounts of electrical energy.

A thermotreatment/leaching method for recycling lead contaminated broken ebonite battery casing material is being developed by the United States Bureau of Mines. In this method, the lead contaminated ebonite battery casing material is burned, which converts the lead oxides and other lead contaminate compounds into carbonates. The ash containing the carbonates is then leached. The levels of lead removal achieved by this method have been poor by comparison to the process of the present invention, and the burning of ebonite battery casing material introduces the possibility of air pollution. More specifically, to date, this method has failed to meet the lead contamination cleanup standards set by the EPA discussed above.

An environmentally sound method is needed to clean up the present problems that have been created by discarded lead-contaminated ebonite battery casing material, to prevent new problems from arising, and to produce a recycled ebonite product that can re-enter the market as a safe, usable material. Clean ebonite casing material is potentially valuable as a material resource or as a fuel. Standard testing procedures indicate a heat content of 13,000 BTU/lb, which is comparable with Indiana coal. It can be pelletized, powdered, or otherwise easily prepared for combustion in any furnace that can utilize coal as a fuel. Moreover, the cleaned material can also be used as a filler in roads, other asphalt applications, and a variety of other products. Up to 3% of the recycled material can be incorporated into new battery casings.

SUMMARY OF THE INVENTION

One embodiment of the invention is a process for detoxifying lead contaminated material, comprising: (a) providing a collection of a lead contaminated material that has been physically separated from associated wastes; (b) milling the contaminated material into particle sizes sufficiently small to permit effective chemical extraction of the lead contaminating the material; (d) leaching the lead contamination from the milled material with a chemical extractant that is reactive with the lead contamination, that is highly mobile, and that forms highly soluble lead-extractant leachate compounds; (e) washing leachate from the milled material with an acidic detergent; (f) releaching lead contamination from the milled material with the chemical extractant of said leaching step; (g) rewashing leachate from the material with an acidic detergent; (h) rinsing the milled material with water; (i) washing the milled material with an alkaline detergent; and (j) rerinsing the milled material with water.

Another embodiment of the process of the invention is a process for detoxifying lead contaminated broken ebonite battery casing material, comprising: (a) providing a collection of broken ebonite battery casing material that has been physically separated from other battery fractions and other associated wastes; (b) milling the material into particle sizes ranging from about $\frac{1}{8}$th inch to about $\frac{3}{8}$ths inch in diameter; (c) leaching combined lead from the milled material with a chemical extractant that includes nitric acid; (d) washing leachate from the milled material with an acidic detergent; (e) releaching combined lead from the milled material with a chemical extractant that includes nitric acid; (f) rewashing leachate from the milled material with an acidic detergent; (g) rinsing the milled material with water; (h) washing the milled material with an alkaline detergent; and (i) rerinsing the milled material with water.

It is an object of the invention to provide a process for detoxifying lead contaminated materials that is relatively simple, environmentally sound, and does not require the introduction of new or exotic chemistry or mechanical equipment.

It is a further object of the invention to provide a much needed process for detoxifying broken ebonite battery casing materials to detoxify existing waste disposal sites and to recycle ebonite.

Related and further objects and advantages of the invention will be apparent from the following discussion.

DESCRIPTION OF THE PREFERRED EMBODIMENT

Figure 1:
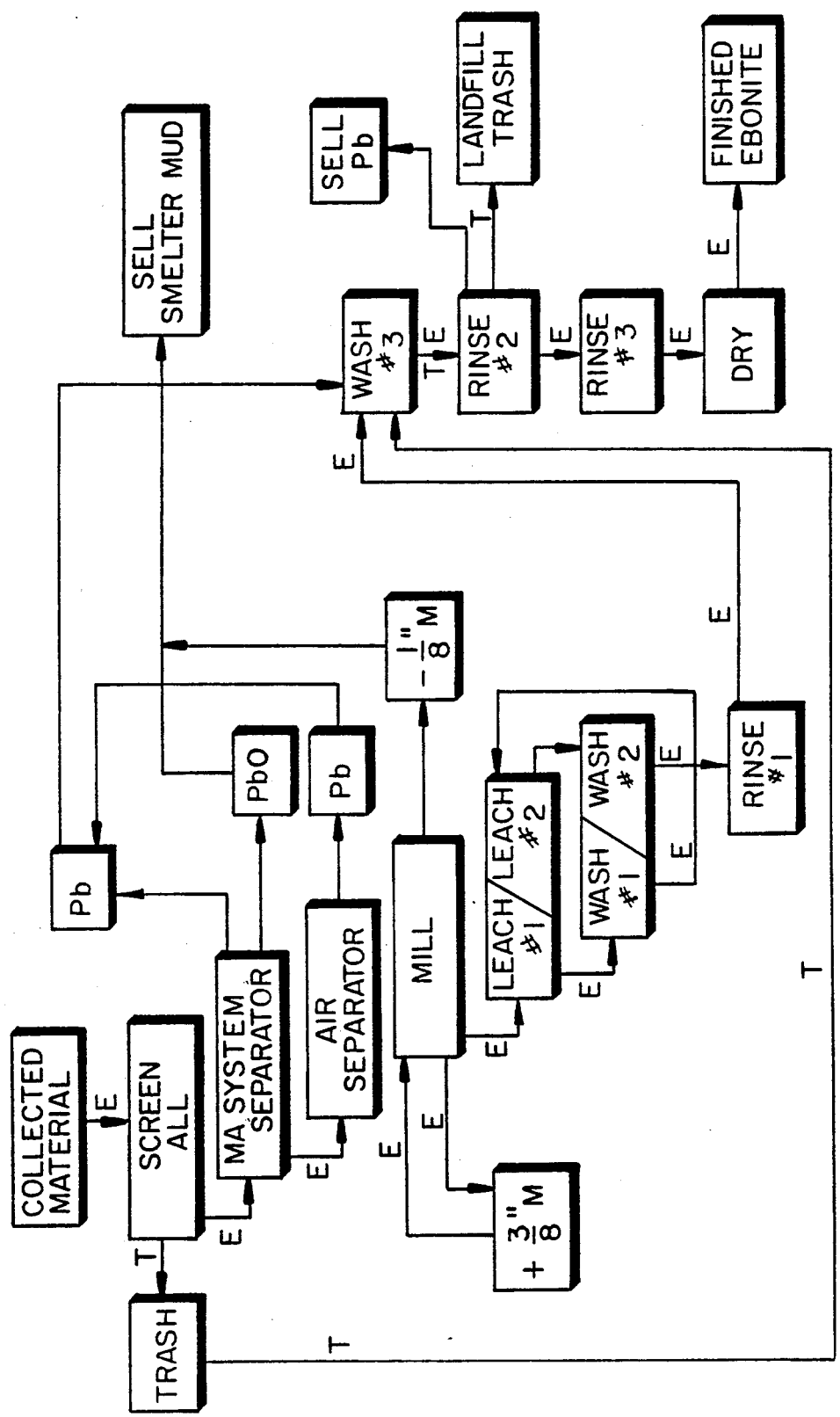
FIG. 1 is a schematic diagram of a preferred embodiment of the process of the invention as applied to the detoxification of lead contaminated ebonite battery casing material taken from a waste site.

For the purposes of promoting an understanding of the principles of the invention, reference will now be made to a preferred embodiment of the process of the invention as applied to the detoxification of lead contaminated broken ebonite battery casing material taken from a waste site, and a specific drawing and language will be used to describe the same. It will nevertheless be understood that no limitation of the scope of the invention is thereby intended, such alterations and further modifications in the preferred embodiment discussed and illustrated, and such further applications of the principles of the invention as described and illustrated therein being contemplated as would normally occur to one skilled in the art to which the invention relates.

In the preferred embodiment of the process of the invention, broken ebonite battery casing material and associated battery fragments, whether from waste site materials or from freshly broken batteries, are put through standard battery case classification equipment used by most commercial battery breakers to separate these materials into lead, lead oxide, plastic, and ebonite fractions. Waste site material is first screened to remove miscellaneous trash and debris greater than approximately one inch in diameter.

The case classification separation is not perfectly efficient, so the ebonite fraction is further classified using a standard air/gravity separator. Residual paper and plastic leave through the top of the separator, lead and lead oxide drop out through the bottom of the separator, and the ebonite battery casing material is floated into the next processing area.

The initial processing of ebonite battery casings materials according to a preferred process of the invention is therefore physical in character. Whether the materials are obtained from a commercial battery breaker or from an abandoned secondary lead smelter waste site, the broken ebonite battery casings material must be provided for processing in a collection that is as free of other battery components and wastes as possible. Care is especially taken that any elemental lead materials are physically separated from the ebonite battery casing material because of lead's potential for vigorous reaction with the chemical lead extractants utilized in the preferred embodiment of the invention. This not only avoids wasting extractants (since the lead is recoverable without having to be dissolved first), but it also avoids the potential for producing lead/extractant by-product pollutants, which could pose both occupational and environmental problems.

During the physical processing, the broken ebonite battery casing material is milled into particle sizes suitable for chemical extraction of the lead contaminates within the material and, in the preferred process of the invention, the "fines" will be separated for separate treatment or disposal.

Following physical processing, the lead contamination within the milled ebonite battery casings material is chemically extracted. The major problem faced in cleaning the pores, cracks and crevices on the surface of the milled ebonite is to remove the contaminating combined lead compounds chemically and to retreat with the lead contamination in solution The keys to efficient lead contamination removal with a chemical extractant are thus wide reactivity of the extractant with the various combined lead compounds present, high mobility of the extractant (so that it penetrates the pores, cracks and crevices well), and high solubility of the lead-extractant compounds produced. Based on experiments to date with a variety of possible chemical extractants, an extractant including equal volumes of concentrated nitric acid, $HNO_3$, and water was selected as the preferred leaching agent for lead contaminated ebonite battery casings. Several other chemical leaching agents would work, but none in as short a time or to the same degree as the preferred nitric acid solution. Nine molar (1:1) nitric acid solution proved to be the most preferred leaching agent for optimum results in all leaching operations. The principal reaction is as follows:

$$PbO + 2HNO_3 \rightarrow Pb(NO_3)_2 + H_2O$$

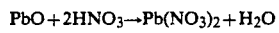

Experiments to date also indicated that after reaction of the chemical extractant with the lead contaminates, the leachate formed tended to remain in the pores, cracks and crevices of the ebonite. Thus, washing the milled ebonite casing materials with detergents followed by water rinsing was required to complete the removal process.

Ebonite battery casing materials processed by this preferred process of the invention proved to be successful in meeting the EPA objectives described above. The milled ebonite battery casing material processed in this manner will contain: <100 ppm total lead and <5 ppm TCLP leachable lead.

Referring now to FIG. 1, there is shown a schematic diagram of a preferred embodiment of the process of the invention applied to the detoxification of ebonite battery casing materials collected at an abandoned secondary lead smelter site. In this FIG., "E" indicates the path of ebonite battery casing material and "T" indicates the path of trash and other fractions.

THE EBONITE BATTERY CASING MATERIAL

As the collected material is dumped onto a screen-all unit, it will fall through the 1- to 2-inch holes and collect under the unit, ready to be moved into the next step. The trash (rocks, dirt lumps, bricks, tree limbs, paper, and metal pieces) is rejected by the screen-all and falls to the back and one side of the unit. These materials are probably lead contaminated and are set aside until ready to process through the system described below under "Extraneous Material."

Materials containing large quantities of elemental lead and/or lead oxide are processed through an M.A. float sink separator. This commercially available unit works on the principle difference between the specific gravities of the material and of water. The water is pumped through the system at a fairly rapid rate. This velocity carries the materials until a baffle plate is reached. At this point, the water slows down and the heaviest materials are dropped out. This procedure is repeated three times to separate all of the different materials. The separations are: lead metal, lead oxide, plastic, ebonite.

Small pieces of lead metal do get through with the ebonite. The gravity/air separator, which is also commercially available, will separate out the grid material from lighter materials such as paper or battery separators, floating the second heaviest material, which is the ebonite, and allowing the heaviest material, the lead metal, to exit the side ports into a separate container.

The ebonite material moves to the next step, while all other materials will be diverted to the system described below under "Extraneous Material."

After the ebonite is separated, it proceeds through a commercially available hammer mill to adjust the particle size to the limits: <⅜in., >⅛in. in diameter. This is an optimum size for lead contamination leaching, but is still large enough for wet milled ebonite material to be handled efficiently. The particle size is very important. Material that is too small is nearly impossible to work with. Material that is too large will not pass the TCLP leachate test.

Nine (9) molar (1:1) nitric acid is used for the leaching. This amounts to a 50% solution of the acid and water. The milled ebonite material enters the acid directly from the mill. The mixing is accomplished with the recirculating action of a 60 gallon per minute pickle pump (a pump that will move liquids with a high solid content). This leaching action is continued for one to two hours, depending on the ambient temperature and the degree of contamination expected.

Once the leach time has expired, the manifold valves on the pump are repositioned to deliver the recirculating acid/ebonite mixture to a screen belt conveyor. The acid runs through the screen belt, with any dislodged insolubles, and is returned to the leaching tank via an additional pump. The ebonite is then conveyed into the first wash tank where it is recirculated by a pickle pump. This operation continues for approximately 30 minutes. A commercially available detergent, trade name CITRONOX, is used at a strength of 5% in ambient temperature water. This detergent is an acid-based detergent with a pH of about 2.5, which makes it very compatible with the acid solution from the leach tank. The milled ebonite material is again separated and Placed back into the leaching acid tank for an additional one hour of leaching. The separation is repeated, and the milled material is washed for an additional 30 minutes.

When the separation procedure is completed, the milled ebonite material is rinsed with recycled system water and 3 transferred to the number 3 wash tank where it is washed for 30 to 45 minutes. This operation uses a commercially available detergent, tradename LIQUONOX. The detergent is at a 3% concentration level by volume and is an alkaline detergent, having a pH of about 9.5. With this high pH, the detergent neutralizes any remaining acid. This detergent removes any materials the acid detergent was unable to dislodge; in particular paper labels.

The milled ebonite material is rinsed with fresh water. This is the only point in the preferred process of the invention where fresh water is introduced. All other water utilized in the preferred process of the invention is recycled water. All water is "backed up" in the process so that the dirtiest water is utilized first and the cleanest is utilized for the last rinsing operation.

An auger conveyor is used for the final separation. The milled ebonite material drains as it is separated. An optional drying system is available if required for the end user. The milled ebonite material must be dry enough to pass the RCRA Paint filter test. The milled ebonite material is then packaged and covered to stay clean.

ELEMENTAL LEAD

Hard or elemental lead is rendered non-dusty by allowing it to enter the process at the point of wash tank 3. This lead material is washed for 15 minutes, rinsed, drained, and placed into drums for shipment. Hard lead is more valuable than any other lead compounds.

EXTRANEOUS MATERIALS

The first step in the processing of broken ebonite battery casing material is the physical separation of extraneous materials such as rocks, dirt, etc. All this material is potentially lead contaminated. These screen-all "rejects" are collected until a sufficient quantity exists for processing. As with the hard lead, the trash will enter the process at the point of wash tank 3. The wash and rinse processes followed by a drain dry step is all that is needed to remove the dusty lead contamination from these materials.

Trash materials may now be landfilled in a sanitary or special waste landfill or disposed of on site.

ACID REUSE/CONVERT TO BY-PRODUCT

As leaching progresses, the nitric acid becomes weaker and the concentration of lead nitrate increases to a point where the acid will no longer leach efficiently. When this happens, the acid can be regenerated by the addition of a sulfate, such as sulfuric acid. The lead will convert to the insoluble sulfate and precipitate out of solution. It can then be filtered off as saleable lead material.

The spent nitric acid may also be converted directly into fertilizer by the addition of sodium or ammonium hydroxide. This process requires the lead first to be reduced by the addition of a sulfate. However, a crown ether system will be necessary to polish out the remaining lead.

The degree of contamination of the acid will be the deciding factor in terms of whether the acid can be reused. Highly contaminated acid can only be used to make fertilizer.

RINSE WATER RECYCLE

Fresh water is introduced into the system only at the point of the final rinse. All other water and acid overflows will be treated through an ancillary system, including a conventional crown ether column, such as those available from the Serpentex Conveyor Company, to recycle the water and acids from the process of the invention for reuse.

Crown ethers are complex organic molecules that possess unusual properties. One such property is the ability of the molecules to selectively capture and hold certain other molecules or atoms. This provides an ancillary method for removing sufficient lead from the solutions from the process of the invention that they can be reused, while at the same time providing a means of polishing the discharge water to regulatory levels. The regenerated acids are converted into a fertilizer component. Solids from the pre-filter step prior to a crown ether column can be sold to a secondary lead smelter.

EXAMPLE 1

A typical batch-wise result from this process involved a 1000-lb batch of waste site material containing broken ebonite battery casings. This waste site material had an initial analysis of 2600 mg/kg total lead. After processing, the milled ebonite material was analyzed and found to have 234 mg/kg total lead (91% reduction) and 4.2 mg/L TCLP leachate lead. This milled ebonite material was no longer hazardous under any applicable EPA criteria. The cleaned milled ebonite material was relatively uniform in color and texture and easily flowed without agglomeration. It had a faint odor of nitric acid, indicating that additional washing and rinsing may have further reduced the deminimous lead content.

The process of the invention works as the result of its specialized steps developed as a result of lengthy experimentation with combinations of extraction chemicals and various other method refinements. In work completed to date, an experimental pilot plant to practice the preferred process of the invention can process approximately 500 pounds of collected material per hour, but a scale up can be accomplished to any tonnage range determined to be practical for any site. A logical next step would be to design a plant of higher tonnage capability for processing materials to be detoxified from other Plants: i.e., secondary lead smelters. Contemporaneously, a mobile unit will be used in cleaning up the Superfund sites identified by the EPA as containing ebonite battery casing material as the primary contaminant.

The process of the present invention as applied in the preferred embodiment illustrated and described to detoxify broken ebonite battery casing material is a much needed tool in the lead recycling industry that has eluded other experimenters in the field. The preferred process of the invention will correct existing problems, and prevent any new problems from being created by this difficult to handle material. Further, the preferred process will accomplish these goals without polluting the environment and without the use of extremely dangerous chemicals or the consumption of large quantities of energy.

Recycling of the resources involved in detoxifying broken ebonite battery casings utilizing the preferred process of the invention is a definite advantage over the past practice of landfilling the material. In addition to creating a product of commercial value, the fuel value of the processed ebonite could reduce the consumption of coal and even allow the use of low grade coal deposits currently not used due to low BTU values.

The process of the invention utilizes chemical extractants to remove combined lead from lead-contaminated wastes and byproduct materials. Chemical extractants useful in the process of the invention would include not only acid extractants of the preferred embodiment but also other chemical extractants (chelating agents, etc.). In addition, the process of the invention would work not only upon ebonite battery casing materials, but also upon associated materials, including plastic battery casings materials and soils. Detoxifying plastic battery casings by the process of the invention would be quite feasible and would represent an obvious extension of the preferred process of the invention to a related material.

It is also to be clearly understood that other byproduct materials are included as objects of the process of the invention, not simply wastes, because currently, several commercial battery breakers send materials to the furnace, and do not consider such materials "wastes" under the EPA definition.

The process of the invention may also be applied to other lead contaminated materials. For example, in the production of lead at secondary lead smelters, two lead-bearing, byproduct solids are produced: drosses and slags. The drosses are returned to the furnace to recover the lead, but part of the slag is discarded. Slag materials have previously passed the EP Tox test and the structural integrity protocol, and therefore could be discarded at ordinary solid waste landfills. However, the TCLP leachate protocol is different, and the slag often fails the lead characteristic. Because of this, the slag must now be treated to stabilize the metals prior to land disposal, which greatly increases disposal costs.

The process of the invention will adequately treat slag with minor modifications. The two major differences in the process as it is applied to slag, as opposed to the process of the preferred embodiment applied to broken ebonite battery casing material, are: (1) slag has low porosity, so it is difficult to meet the EPA total lead standard by surface extraction alone, and (2) the presence of iron sulfides (Pyrite type materials) causes the production of toxic hydrogen sulfide during acid extraction. The total lead level can be reduced if the material is milled very fine before extraction. This exposes more surface area to the chemical extractant and the fineness can be altered according to the final lead level required. Because the slag is low in organics and porosity, it is not as essential to use a highly acidic extractant. The use of active extractants, i.e., crown ethers, or chelating agents, would permit the use of a higher pH extractant than was utilized in the preferred embodiment, and thus would reduce the potential for hydrogen sulfide production significantly.

The process of the invention is a novel combination of physical and chemical methods resulting in the beneficial recycling of lead contaminated materials, which historically have prevented the effective cleanup of no less than 25 Superfund sites in the U.S. and/or which increasingly are taking up finite hazardous waste landfill space. The process of the invention is an efficient, effective and environmentally sound method by which: (1) problems created in the past by lead contaminated material can be corrected; (2) new problems related to lead contaminated material can be prevented; (3) a detoxified product can reenter the market as a safe, usable material.

While the invention has been illustrated and described in detail in the drawings and foregoing description, the same is to be considered as illustrative and not restrictive in character, it being understood that only the preferred embodiment has been illustrated and described and that all changes and modifications that come within the spirit of the invention are desired to be protected.

What is claimed is:
1. A process for detoxifying lead contaminated ebonite material, comprising:
  (a) providing a collection of broken ebonite material that has been physically separated from other broken battery fractions, including elemental lead fractions, and other associated wastes;
  (b) milling the ebonite material into particle sizes ranging from about ⅛th inch to about ⅜ths inch in diameter;
  (c) leaching combined lead from the milled ebonite material with a chemical extractant that includes nitric acid;
  (d) washing leachate from the milled ebonite material with an acidic detergent;
  (e) releaching combined lead from the milled ebonite material with a chemical extractant that includes nitric acid;
  (f) rewashing leachate from the milled ebonite material with an acidic detergent;
  (g) rinsing the milled ebonite material with water;
  (h) washing the milled ebonite material with an alkaline detergent; and
  (i) rerinsing the milled ebonite material with water to produce a nonhazardous milled ebonite material, containing less than about 100 ppm total lead and less than about 5 ppm TCLP leachable lead.

2. The process of claim 1 wherein the chemical extractant of the leading and releaching steps (c) and (e) is about a nine (9) molar (1:1) nitric acid solution.

3. The process of claim 1 wherein the acidic detergent of washing and rewashing steps (d) and (f) has a pH of about 2.5.

4. The process of claim 1 wherein the alkaline detergent of washing step (h) has a pH of about 9.5.

5. The process of claim 1 wherein said milling step includes separating the fines of the milling step from the milled material for separate processing.

6. The process of claim 1, and further comprising:
(j) washing the other battery fractions and associated wastes of step (a) with the alkaline detergent of step (h); and
(k) rinsing the other battery fractions and associated wastes with water.

7. The process of claim 6 wherein the other battery fractions include lead metal, lead oxide and plastic.

8. The process of claim 6 wherein the associated wastes include lead contaminated soil, rocks, paper, wood, separators, bricks, and tree limbs from abandoned secondary lead smelter sites.

9. A process for detoxifying lead contaminated material, comprising:
(a) providing a collection of a lead contaminated material that has been physically separated from any elemental lead material and from any associated wastes;
(b) milling the contaminated material into particle sizes sufficiently small to permit effective chemical extraction of the lead contaminating the material;
(d) leaching the lead contamination from the milled material with a chemical extractant that is reactive with the lead contamination, that is highly mobile, and that forms highly soluble lead-extractant leachate compounds;
(e) washing leachate from the milled material with an acidic detergent;
(f) releaching lead contamination from the milled material with the chemical extractant of said leaching step;
(g) rewashing leachate from the material with an acidic detergent;
(h) rinsing the milled material with water;
(i) washing the milled material with an alkaline detergent; and
(j) rerinsing the milled material with water to produce a nonhazardous milled material.

10. The process of claim 9 wherein the lead contaminated waste is broken ebonite battery casing material.

11. The process of claim 9 wherein the lead contaminated material is broken plastic battery casing material.

12. The process of claim 9 wherein the lead contaminated material is the slag byproduct of secondary lead production.

13. The process of claim 12 wherein the chemical extractant includes a chelating agent.

14. The process of claim 12 wherein the chemical extractant includes a crown ether.

15. The process of claim 10 wherein the chemical extractant is nine molar (1:1) nitric acid solution.

16. The process of claim 11 wherein the chemical extractant is nine molar (1:1) nitric acid solution.

* * * * *

UNITED STATES PATENT AND TRADEMARK OFFICE
CERTIFICATE OF CORRECTION

PATENT NO. : 5,127,963

DATED : July 7, 1992

INVENTOR(S) : George R. Hartup, et al.

It is certified that error appears in the above-identified patent and that said Letters Patent is hereby corrected as shown below:

On the Title page, item [57], in the Abstract, line 15, please change the word "battyer" to -- battery --.

In column 5, line 50, please insert a period between the words "solution" and "The".

In column 7, line 19, please change the word "Placed" to -- placed --.

In column 7, line 25, please change the numeral "3" in its first instance to the word -- is --.

In column 7, line 45, please change the word "Paint" to -- paint --.

In column 8, line 68, please change the word "Plants" to -- plants --.

In column 9, line 65, please change the word "Pyrite" to -- pyrite --.

Signed and Sealed this

Seventeenth Day of August, 1993

*Attest:*

BRUCE LEHMAN

*Attesting Officer*     *Commissioner of Patents and Trademarks*